(12) United States Patent  (10) Patent No.: US 6,597,693 B1
Leung  (45) Date of Patent: Jul. 22, 2003

(54) COMMON SCALABLE QUEUING AND DEQUEUING ARCHITECTURE AND METHOD RELATIVE TO NETWORK SWITCH DATA RATE

(75) Inventor: Eric Tsin-Ho Leung, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/316,182

(22) Filed: May 21, 1999

(51) Int. Cl.[7] .............................................. H04L 11/00
(52) U.S. Cl. ...................................... 370/386; 370/229
(58) Field of Search .............................. 370/386, 351, 370/357, 355, 358, 360, 366, 422, 428, 392, 413–419, 391, 389, 387, 397, 395.1, 402, 404, 420, 445, 446, 447, 461, 462, 449, 276, 296, 465, 229, 230, 231; 710/100, 117; 709/237, 238, 208, 249

(56) References Cited

U.S. PATENT DOCUMENTS

| 5,448,558 | A |   * | 9/1995 | Gildea et al. ................ 370/412 |
| 5,515,376 | A |     | 5/1996 | Murthy et al. ............... 370/402 |
| 5,909,564 | A |   * | 6/1999 | Alexander et al. ........... 710/316 |
| 6,052,751 | A |   * | 4/2000 | Runaldue et al. ........... 710/100 |
| 6,233,244 | B1 |  * | 5/2001 | Runaldue et al. ........... 370/412 |

* cited by examiner

Primary Examiner—Dang Ton

(57) ABSTRACT

A network switch arrangement and method for providing a common architecture for queuing and dequeuing of data frames as they are transferred from a switch port to an external memory and similarly retrieved from the external memory to the switch port, irrespective of the particular data rate of the port. Logic controlling the actual data path is partitioned from logic responding to port data rate information by providing a "handshaking" communication arrangement between the two logics independent of the data rate. Hence, scalability of the data path over a wide range of data rates may be achieved while maintaining a single, common logic architecture.

14 Claims, 11 Drawing Sheets

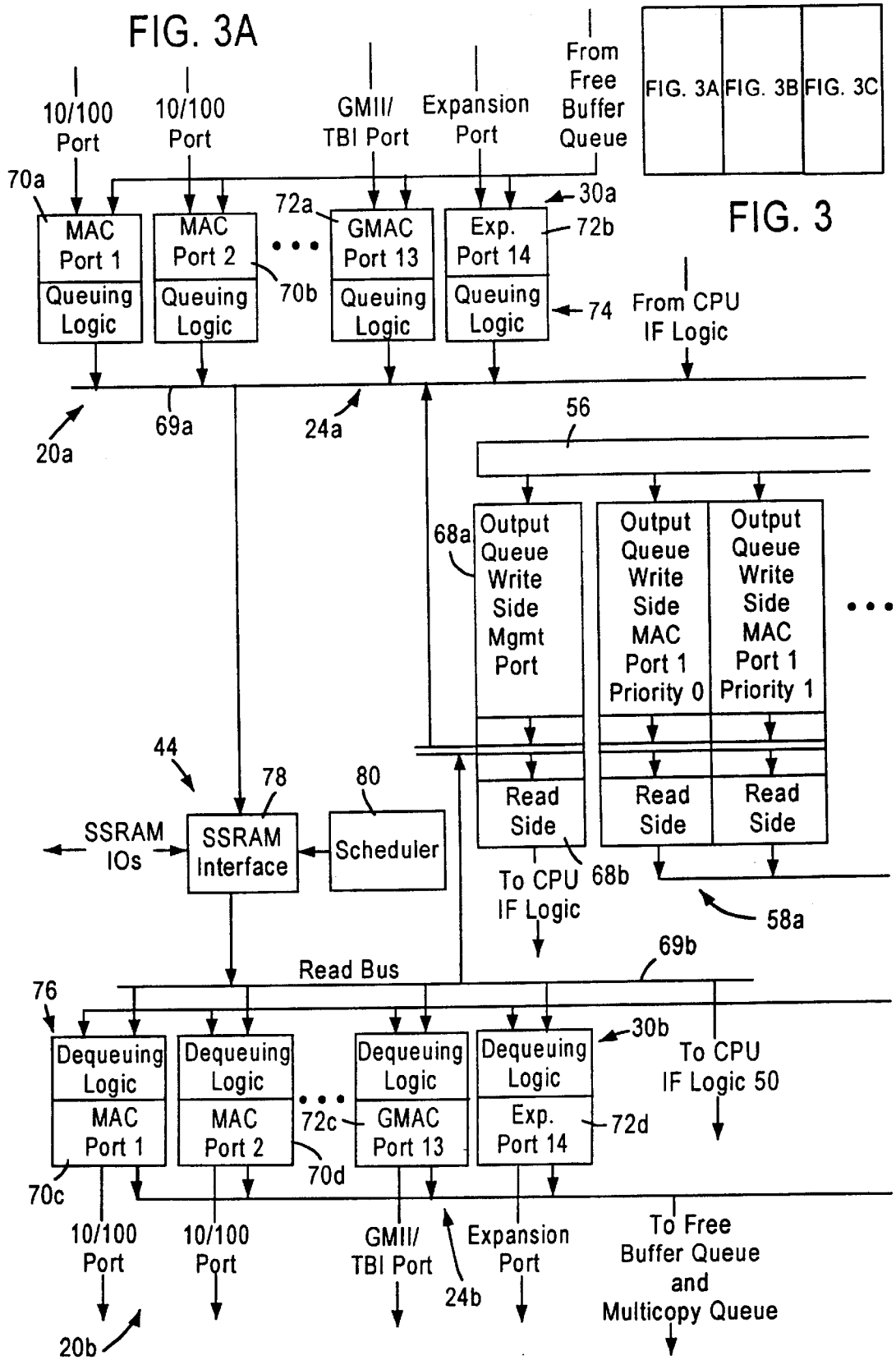

COMMON SCALABLE QUEUING AND DEQUEUING ARCHITECTURE AND METHOD RELATIVE TO NETWORK SWITCH DATA RATE

BACKGROUND OF THE INVENTION

1. Field of the Invention

The present invention relates to networks and more particularly, to a system and method of controlling network traffic data in a switched network operating according to Ethernet (IEEE 802.3) protocol.

2. Background Art

Switched local area networks use a network switch for supplying data frames between network stations or other network nodes, where each network node is connected to the network switch by a media. The switched local area network architecture uses a media access control (MAC) enabling network interfaces within each network node and the network switch to access the media. A network switch stores and forwards data frames received from transmitter nodes to destination nodes based on header information and the data in the received frames, including source and destination addresses. An external memory, such as an SSRAM, is used by the network switch to temporarily store the data frames as they are passed through the switch.

In particular, a multi-port network switch typically stores and fetches data frames stored in its external memory via read and write buses within the switch connected to each port through a port interface, an external bus, and an external bus interface connecting the read and write busses to the external bus. The multi-port switch may be used to interconnect network segments having different network data rates (i.e., wire rates), hence, individual ports within a multi-port network switch may need to accommodate a wide range of differing data transfer rates (e.g., 10 Mbps, 100 Mbps or 1 GBps). Hence, a port interface and associated port interface logic is needed to efficiently transfer data packets between the individual ports and the external memory without causing blocking (i.e., delay in transferring a data packet received at a switch port). The port interface must be capable of transferring data at rates corresponding to the particular data transfer rate of the port.

Hence, to achieve non-blocking conditions in all ports, each port interface architecture and logic corresponding to a particular port data transfer rate is optimized to efficiently accommodate the particular port data transfer rate. Consequently, the need for different port interface architectures and interface logic dependent upon the port data transfer rate correspondingly increases the cost and overall complexity of a network switch having ports of differing data transfer rates.

SUMMARY OF THE INVENTION

Hence, there is a need for a multi-port network switch having a common port interface architecture independent of the port data transfer rate to minimize the cost and complexity associated with each individual network switch, while maintaining non-blocking characteristics. In addition, there is a need for a common logic scheme for each port interface, also independent of the port data rate, to further minimize the cost and overall complexity of each network switch.

These and other needs are met by the present invention which provides a common architecture for all of the ports within a network switch that is scalable over a wide range of data rates. This scalability is accomplished through a common logic scheme that is independent of the port data rate by utilizing a "handshaking" protocol to control the data path without reference to the data rate.

According to one aspect of the invention, a network switch arrangement includes an external memory for temporarily storing data packets to be forwarded by the network switch and an associated external memory controller within the switch. Also within the switch, the network switch ports each have a predetermined transmission rate for receiving data packets from and transmitting data packets to external network nodes. A data packet transmission controller is associated with each network switch port for controlling the transmission of data packets between the external memory and the network switch ports. A state machine within the data packet transmission controller receives predetermined information from the external memory controller concerning data packets being either transmitted or received by the network switch port. Based on the predetermined information, the state machine issues a command signal to a scalable data path logic within the data packet transmission controller for controlling transmission of the data packets. The scalable data path logic is also configured to be scaled to the rate of transmission of data packets between the network switch port and the external memory based on the predetermined data rate of the network switch port.

The scalable data path logic affords the present invention scalability of the data path over a wide range of data rates may be achieved while maintaining a single, common logic architecture.

According to another aspect of the invention, a method of controlling a transmitting and receiving data path within a network switch port includes writing data received at the port to an external memory or reading data to be transmitted by the port from the external memory via the transmitting and receiving data path at a certain defined data rate. Additionally, a control signal is generated to control the transmitting and receiving data path based upon predetermined information concerning a particular data packet. Finally, the data rate of the transmitting and receiving data path is scaled to the certain defined data rate based upon the control signal.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

DETAILED DESCRIPTION OF ILLUSTRATIVE EMBODIMENTS

The present invention will first be described with the example of a switch in a packet switched network, such as an Ethernet (IEEE 802.3) network. It will become apparent, however, that the present invention is also applicable to other packet switched systems, as described in detail below, as well as to other types of systems in general.

An embodiment of the present invention will then be described concerning the queuing and dequeuing blocks within the described switch.

Switch Architecture Overview

Figure 1:
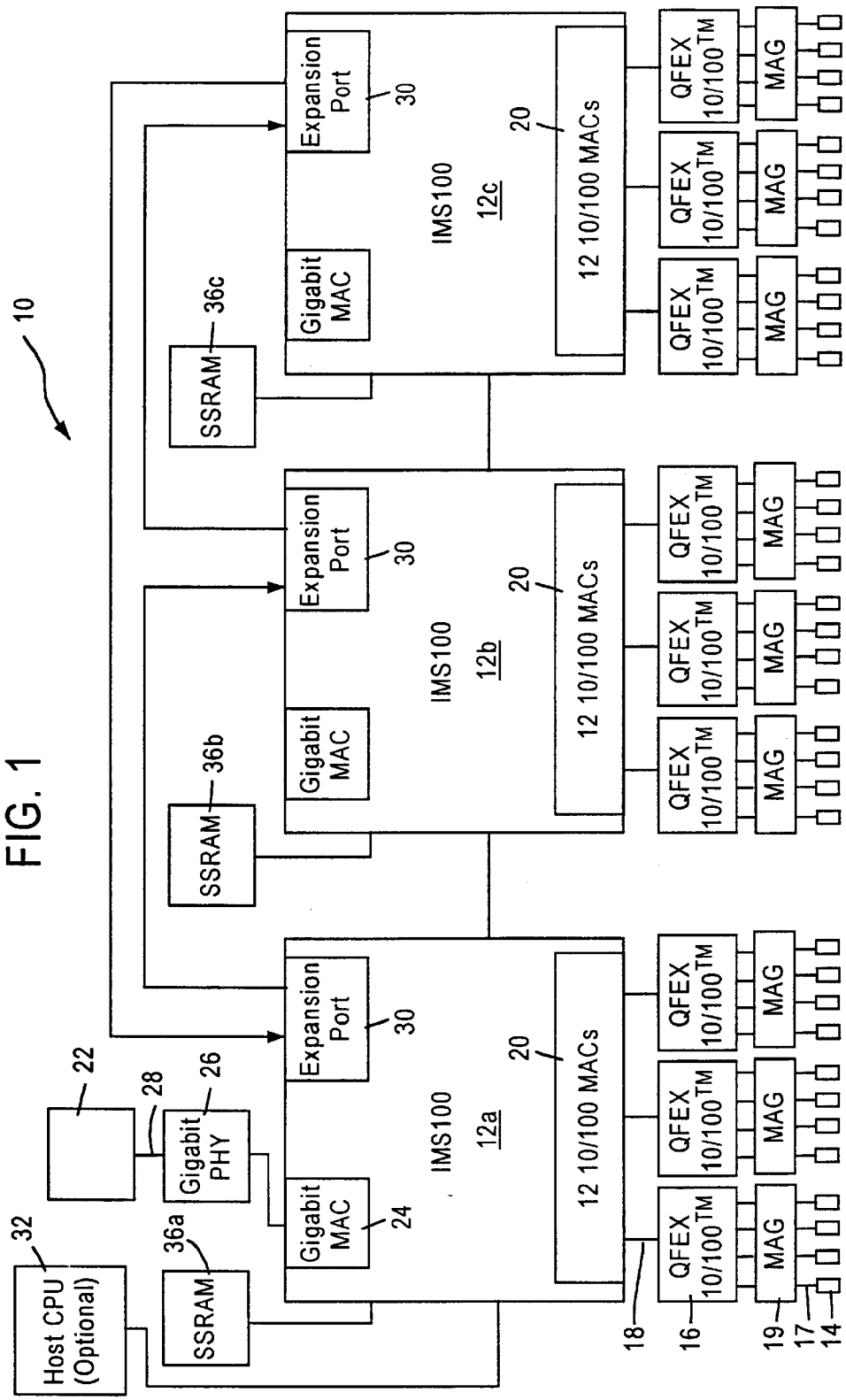
FIG. 1 is a block diagram of a packet switched network including a multiple port switch according to an embodiment of the present invention.

FIG. 1 is a block diagram of an exemplary system in which the present invention may be advantageously employed. The exemplary system 10 is a packet switched network, such as an Ethernet (IEEE 802.3) network. The packet switched network includes integrated multiport switches (IMS) 12 that enable communication of data packets between network stations. The network may include network stations having different configurations, for example twelve (12) 10 megabit per second (Mb/s) or 100 Mb/s network stations 14 (hereinafter 10/100 Mb/s) that send and receive data at a network data rate of 10 Mb/s or 100 Mb/s, and a 1000 Mb/s (i.e., 1 Gb/s) network node 22 that sends and receives data packets at a network speed of 1 Gb/s. The gigabit node 22 may be a server, or a gateway to a high-speed backbone network. Hence, the multiport switches 12 selectively forward data packets received from the network nodes 14 or 22 to the appropriate destination based upon Ethernet protocol.

Each multiport switch 12 includes a media access control (MAC) module 20 that transmits and receives data packets to and from 10/100 Mb/s physical layer (PHY) transceivers 16 via respective reduced media independent interfaces (RMII) 18 according to IEEE 802.3u protocol. Each multiport switch 12 also includes a gigabit MAC 24 for sending and receiving data packets to and from a gigabit PHY 26 for transmission to the gigabit node 22 via a high speed network medium 28.

Each 10/100 Mb/s network station 14 sends and receives data packets to and from the corresponding multiport switch 12 via a media 17 and according to either half-duplex or full duplex Ethernet protocol. The Ethernet protocol ISO/IEC 8802-3 (ANSI/IEEE Std. 802.3, 1993 Ed.) defines a half-duplex media access mechanism that permits all stations 14 to access the network channel with equality. Traffic in a half-duplex environment is not distinguished over the medium 17. Rather, each half-duplex station 14 includes an Ethernet interface card that uses carrier-sense multiple access with collision detection (CSMA/CD) to listen for traffic on the media. The absence of network traffic is detected by sensing deassertion of a receive carrier on the media. Any station 14 having data to send will attempt to access the channel by waiting a predetermined time, known as the interpacket gap interval (IPG), after deassertion of the receive carrier on the media. If a plurality of stations 14 have data to send on the network, each of the stations will attempt to transmit in response to the sensed deassertion of the receive carrier on the media and after the IPG interval, possibly resulting in a collision. Hence, the transmitting station will monitor the media to determine if there has been a collision due to another station sending data at the same time. If a collision is detected, both stations stop, wait a random amount of time, and retry transmission.

The 10/100 Mb/s network stations 14 that operate in full duplex mode send and receive data packets according to the Ethernet standard IEEE 802.3u. The full-duplex environment provides a two-way, point-to-point communication link enabling simultaneous transmission and reception of data packets between each link partner, i.e., the 10/100 Mb/s network station 14 and the corresponding multiport switch 12.

Each multiport switch 12 is coupled to 10/100 physical layer (PHY) transceivers 16 configured for sending and receiving data packets to and from the corresponding multiport switch 12 across a corresponding reduced media independent interface (RMII) 18. In particular, each 10/100 PHY transceiver 16 is configured for sending and receiving data packets between the multiport switch 12 and up to four (4) network stations 14 via the RMII 18. A magnetic transformer 19 provides AC coupling between the PHY transceiver 16 and the corresponding network medium 17. Hence, the RMII 18 operates at a data rate sufficient to enable simultaneous transmission and reception of data packets by each of the network stations 14 to the corresponding PHY transceiver 16.

Each multiport switch 12 also includes an expansion port 30 for transferring data between other switches according to a prescribed protocol. Each expansion port 30 enables multiple multiport switches 12 to be cascaded together as a separate backbone network.

Figure 2:
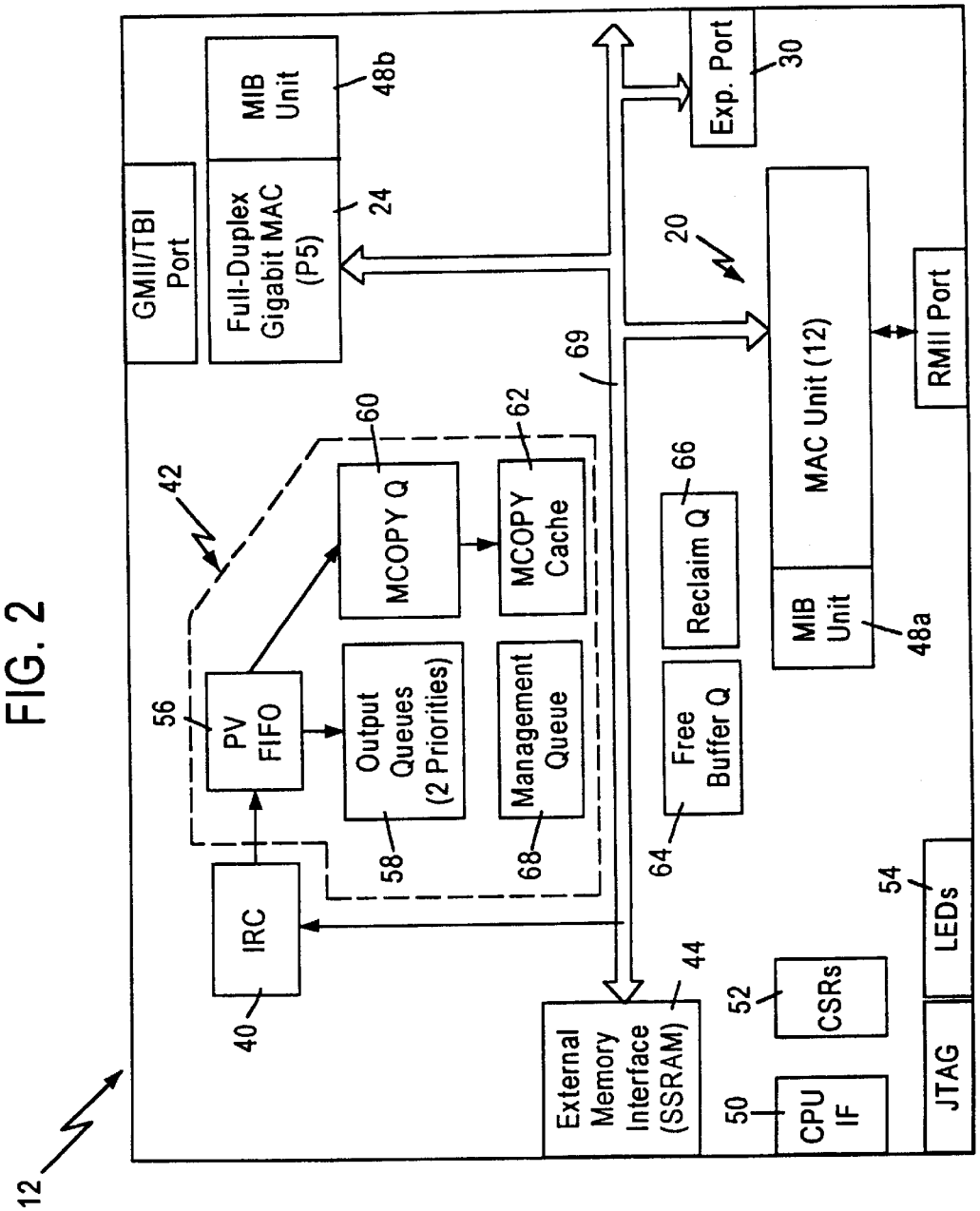
FIG. 2 is a block diagram of the multiple port switch of FIG. 1.

FIG. 2 is a block diagram of the multiport switch 12. The multiport switch 12 contains a decision making engine 40 that performs frame forwarding decisions, a switching subsystem 42 for transferring frame data according to the frame forwarding decisions, an external memory interface 44, management information base (MIB) counters 48a and 48b (collectively 48), and MAC (media access control) protocol interfaces 20 and 24 to support the routing of data packets between the Ethernet (IEEE 802.3) ports serving the network stations 14 and the gigabit node 22. The MIB counters 48 provide statistical network information in the form of management information base (MIB) objects, to an external management entity controlled by a host CPU 32, described below.

The external memory interface 44 enables external storage of packet data in an external memory 36 such as, for example, a synchronous static random access memory (SSRAM), in order to minimize the chip size of the multiport switch 12. In particular, the multiport switch 12 uses the external memory 36 for storage of received frame data and memory structures. The external memory. 36 is preferably either a Joint Electron Device Engineering Council (JEDEC) pipelined burst or Zero Bus Turnaround™ (ZBT)-SSRAM having a 64-bit wide data path and a 17-bit wide address path. The external memory 36 is addressable as upper and lower banks of 128K in 64-bit words. The size of the external memory 36 is preferably at least 1 Mbytes, with data transfers possible on every clock cycle through pipelining. Additionally the external memory interface clock operates at clock frequencies of at least 66 MHz, and, preferably, 100 MHz and above.

The multiport switch 12 also includes a processing interface 50 that enables an external management entity such as a host CPU 32 to control overall operations of the multiport switch 12. In particular, the processing interface 50 decodes CPU accesses within a prescribed register access space, and reads and writes configuration and status values to and from configuration and status registers 52.

The internal decision making engine 40, referred to as an internal rules checker (IRC), makes frame forwarding decisions for data packets received.

The multiport switch 12 also includes an LED interface 54 that clocks out the status of conditions per port and drives an external LED logic. The external LED logic drives LED display elements that are human readable.

The switching subsystem 42, configured for implementing the frame forwarding decisions of the IRC 40, includes a port vector first in first out (FIFO) buffer 56, a plurality of output queues 58, a multicopy queue 60, a multicopy cache 62, a free buffer queue 64, and a reclaim queue 66.

The MAC unit 20 includes modules for each port, each module including a MAC receive portion, a receive FIFO buffer, a transmit FIFO buffer, and a MAC transmit portion. Data packets from a network station 14 are received by the corresponding MAC port and stored in the corresponding receive FIFO. The MAC unit 20 obtains a free buffer location (i.e., a frame pointer) from the free buffer queue 64, and outputs the received data packet from the corresponding receive FIFO to the external memory interface 44 for storage in the external memory 36 at the location specified by the frame pointer.

The IRC 40 monitors (i.e., "snoops") the data bus to determine the frame pointer value and the header information of the received packet (including source, destination, and VLAN address information). The IRC 40 uses the header information to determine which MAC ports will output the data frame stored at the location specified by the frame pointer. The decision making engine (i.e., the IRC 40) may thus determine that a given data frame should be output by either a single port, multiple ports, all ports. (i.e., broadcast) or no ports (i.e., discarded). For example, each data frame includes a header having source and destination address, where the decision making engine 40 may identify the appropriate output MAC port based upon the destination address. Alternatively, the destination address may correspond to a virtual address that the appropriate decision making engine identifies as corresponding to a plurality of network stations. In addition, the frame may include a VLAN tag header that identifies the frame as information destined to one or more members of a prescribed group of stations. The IRC 40 may also determine that the received data packet should be transferred to another multiport switch 12 via the expansion port 30. Hence, the internal rules checker 40 will decide whether a frame temporarily stored in the external memory 36 should be output to a single MAC port or multiple MAC ports.

The internal rules checker 40 outputs a forwarding decision to the switch subsystem 42 in the form of a forwarding descriptor. The forwarding descriptor includes a priority class identifying whether the frame is high priority or low priority, a port vector identifying each MAC port that should transmit the data frame, receive port number, an untagged set, VLAN information, vector identifying each MAC port that should include VLAN information during transmission, opcode, and frame pointer. The port vector identifies the MAC ports to receive the data frame for transmission (e.g., 10/100 MAC ports 1–12, Gigabit MAC port, and/or Expansion port). The port vector FIFO 56 decodes the forwarding descriptor including the port vector, and supplies the frame pointer to the appropriate output queues 58 that correspond to the output MAC ports to receive the data frame transmission. In other words, the port vector FIFO 56 supplies the frame pointer on a per-port basis. The output queues 58 give the frame pointer to a dequeuing block 76 (shown in FIG. 3) which fetches the data frame identified in the port vector from the external memory 36 via the external memory interface 44, and supply the retrieved data frame to the appropriate transmit FIFO of the identified ports. If a data frame is to be supplied to a management agent, the frame pointer is also supplied to a management queue 68, which can be processed by the host CPU 32 via the CPU interface 50.

The multicopy queue 60 and the multicopy cache 62 keep track of the number of copies of the data frame that are transmitted from the respective ports, ensuring that the data frame is not overwritten in the external memory 36 until the appropriate number of copies of the data frame have been output from the external memory 36. Once the number of copies output corresponds to the number of ports specified in the port vector FIFO 56, the frame pointer is forwarded to is the reclaim queue 66. The reclaim queue 66 stores frame pointers that need to be reclaimed and walks the linked list chain to return the buffers to the free buffer queue 64 as free pointers. After being returned to the free buffer queue 64, the frame pointer is available for reuse by the MAC unit 20 or the gigabit MAC unit 24.

Figure 3B:
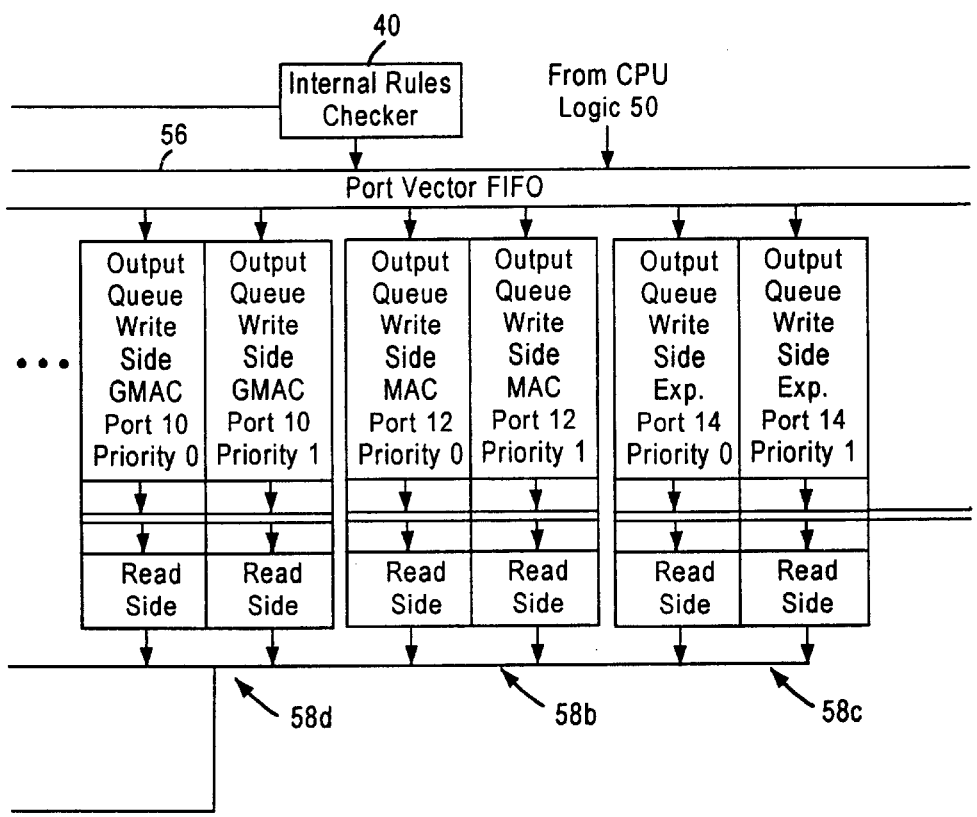
FIG. 3 is a block diagram illustrating in detail the switching subsystem of FIG. 2.
Figure 3C:
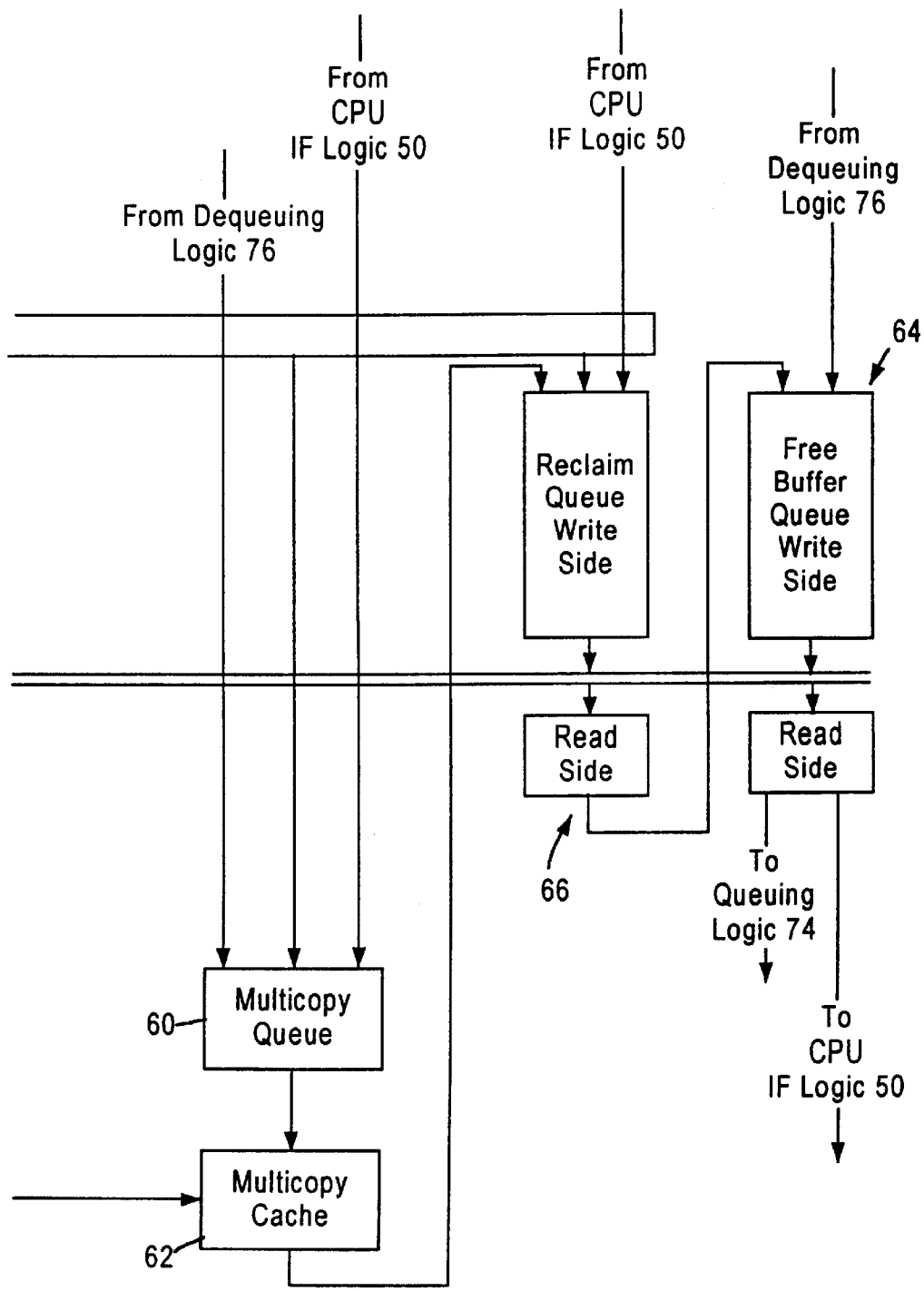

FIG. 3 depicts the switch subsystem 42 of FIG. 2 in more detail according to an exemplary embodiment of the present invention. Other elements of the multiport switch 12 of FIG. 2 are reproduced in FIG. 3 to illustrate the connections of the switch subsystem 42 to these other elements.

As shown in FIG. 3, the MAC module 20 includes a receive portion 20a and a transmit portion 24b. The receive portion 20a and the transmit portion 24b each include 12 MAC modules (only two of each shown and referenced by numerals 70a, 70b, 70c, and 70d) configured for performing the corresponding receive or transmit function according to IEEE 802.3 protocol. The MAC modules 70c and 70d perform the transmit MAC operations for the 10/100 Mb/s switch ports complementary to modules 70a and 70b, respectively.

The gigabit MAC port 24 also includes a receive portion 24a and a transmit portion 24b, while the expansion port 30 similarly includes a receive portion 30a and a transmit portion 30b. The gigabit MAC port 24 and the expansion port 30 also have receive MAC modules 72a and 72b optimized for the respective ports. The transmit portions 24b and 30b of the gigabit MAC port 24 and the expansion port 30a also have transmit MAC modules 72c and 72d, respectively. The MAC modules are configured for full-duplex operation on the corresponding port, and the gigabit MAC modules 72a and 72c are configured in accordance with the Gigabit Proposed Standard IEEE Draft P802.3z.

Each of the receive MAC modules 70a, 70b, 72a, and 72b include queuing logic 74 for transfer of received data from the corresponding internal receive FIFO to the external memory 36 and the rules checker 40. Each of the transmit MAC modules 70c, 70d, 72c, and 72d includes a dequeuing logic 76 for transferring data from the external memory 36 to the corresponding internal transmit FIFO, and a queuing logic 74 for fetching frame pointers from the free buffer queue 64. The queuing logic 74 uses the fetched frame pointers to store receive data to the external memory 36 via the external memory interface controller 44. The frame buffer pointer specifies the location in the external memory 36 where the received data frame will be stored by the receive FIFO.

The external memory interface 44 includes a scheduler 80 for controlling memory access by the queuing logic 74 or dequeuing logic 76 of any switch port to the external memory 36, and an SSRAM interface 78 for performing the read and write operations with the external memory 36. In particular, the multiport switch 12 is configured to operate as a non-blocking switch, where network data is received and output from the switch ports at the respective wire rates of 10, 100, or 1000 Mb/s. Hence, the scheduler 80 controls the access by different ports to optimize usage of the bandwidth of the external memory 36.

Each receive MAC stores a portion of a frame in an internal FIFO upon reception from the corresponding switch port; the size of the FIFO is sufficient to store the frame data that arrives between scheduler time slots. The corresponding queuing logic 74 obtains a frame pointer and sends a write request to the external memory interface 44. The scheduler 80 schedules the write request with other write requests from the queuing logic 74 or any read requests from the dequeuing logic 76, and generates a grant for the requesting queuing logic 74 (or the dequeuing logic 76) to initiate a transfer at the scheduled event (i.e., slot). Sixty-four bits of frame data is then transferred over a write data bus 69a from the receive FIFO to the external memory 36 in a direct memory access (DMA) transaction during the assigned slot. The frame data is stored in the location pointed to by the buffer pointer obtained from the free buffer pool 64, although a number of other buffers may be used to store data frames, as will be described.

The rules checker 40 also receives the frame pointer and the header information (including source address, destination address, VLAN tag information, etc.) by monitoring (i.e., snooping) the DMA write transfer on the write data bus 69a. The rules checker 40 uses the header information to make the forwarding decision and generate a forwarding instruction in the form of a forwarding descriptor that includes a port vector. The port vector has a bit set for each output port to which the frame should be forwarded. If the received frame is a unicopy frame, only one bit is set in the port vector generated by the rules checker 40. The single bit that is set in the port vector corresponds to a particular one of the ports.

The rules checker 40 outputs the forwarding descriptor including the port vector and the frame pointer into the port vector FIFO 56. The port vector is examined by the port vector FIFO 56 to determine which particular output queue should receive the associated frame pointer. The port vector FIFO 56 places the frame pointer into the top of the appropriate queue 58 and/or 68. This queues the transmission of the frame.

As shown in FIG. 3, each of the transmit MAC units 70c, 70d, 72d, and 72c has an associated output queue 58a, 58b, 58c, and 58d, respectively. In preferred embodiments, each of the output queues 58 has a high priority queue for high priority frames, and a low priority queue for low priority frames. The high priority frames are used for frames that require a guaranteed access latency, e.g., frames for multimedia applications or management MAC frames. The frame pointers stored in the FIFO-type output queues 58 are processed by the dequeuing logic 76 for the respective transmit MAC units. At some point in time, the frame pointer reaches the bottom of an output queue 58, for example, output queue 58d for the gigabit transmit MAC 72c. The dequeuing logic 76 for the transmit gigabit port 24b takes the frame pointer from the corresponding gigabit port output queue 58d, and issues a request to the scheduler 80 to read the frame data from the external memory 36 at the memory location specified by the frame pointer. The scheduler 80 schedules the request, and issues a grant for the dequeuing logic 76 of the transmit gigabit port 24b to initiate a DMA read. In response to the grant, the dequeuing logic 76 reads the frame data (along the read bus 69b) in a DMA transaction from the location in external memory 36 pointed to by the frame pointer, and stores the frame data in the internal transmit FIFO for transmission by the transmit gigabit MAC 72c. If the forwarding descriptor specifies a unicopy transmission, the frame pointer is returned to the free buffer queue 64 following writing the entire frame data into the transmit FIFO.

A multicopy transmission is similar to the unicopy transmission, except that the port vector has multiple bits set, designating the multiple ports from which the data frame will be transmitted. The frame pointer is placed into each of the appropriate output queues 58 and transmitted by the appropriate transmit MAC units 20b, 24b, and/or 30b.

The free buffer pool 64, the multicopy queue 60, the reclaim queue 66, and the multicopy cache 62 are used to manage use of frame pointers and re-use of frame pointers once the data frame has been transmitted to its designated output port(s). In particular, the dequeuing logic 76 passes frame pointers for unicopy frames to the free buffer queue 64 after the buffer contents have been copied to the appropriate transmit FIFO.

For multicopy frames, the port vector FIFO 56 supplies multiple copies of the same frame pointer to more than one output queue 58, each frame pointer having a unicopy bit set to zero. The port vector FIFO 56 also copies the frame pointer and the copy count to the multicopy queue 60. The multicopy queue 60 writes the copy count to the multicopy cache 62. The multicopy cache 62 is a random access memory having a single copy count for each buffer in external memory 36 (i.e., each frame pointer).

Once the dequeuing logic 76 retrieves the frame data for a particular output port based on a fetched frame pointer and stores the frame data in the transmit FIFO, the dequeuing logic 76 checks if the unicopy bit is set to 1. If the unicopy bit is set to 1, the frame pointer is returned to the free buffer queue 64. If the unicopy bit is set to zero indicating a multicopy frame pointer, the dequeuing logic 76 writes the frame pointer with a copy count of minus one (−1) to the multicopy queue 60. The multicopy queue 60 adds the copy count to the entry stored in the multicopy cache 62.

When the copy count in multicopy cache 62 for the frame pointer reaches zero, the frame pointer is passed to the reclaim queue 66. Since a plurality of frame pointers may be used to store a single data frame in multiple buffer memory locations, the frame pointers are referenced to each other to form a linked-list (i.e., chain) of frame pointers to identify the stored data frame in its entirety. The reclaim queue 66 traverses the chain of buffer locations identified by the frame pointers, and passes the frame pointers to the free buffer queue 64.

The foregoing description of the switch architecture provides an overview of the switch operations in a packet switched network. A more detailed description of the features of the present invention as embodied in the multiport switch 12 will now be provided. First, the architecture of exemplary queuing and dequeuing blocks will be discussed, followed by details for transferring data between the external memory and network switch ports utilizing the exemplary queuing and dequeuing blocks.

Scalable Queuing and Dequeuing Architecture

As shown in FIG. 3, each MAC (70, 72a or 72b) includes a queuing logic 74 and a dequeuing logic 76. As described previously, the queuing and dequeuing logic blocks are responsible for transferring frame data between the MAC transmit (Tx) or receive (Rx) FIFO's to the external memory 36. Although the queuing logic blocks 74 and the dequeuing logic blocks 76 differ in their respective architectures, each of the MAC's of the present embodiment, whether a 10/100 Mbps, 1 Gbps port or 1.2 Gbps port, have queuing and dequeuing blocks sharing common respective architectures. As will be described below, common architectures for the queuing or dequeuing blocks, irrespective of the data rate of the port, affords interchangability of the blocks between ports of differing rates.

Figure 4:
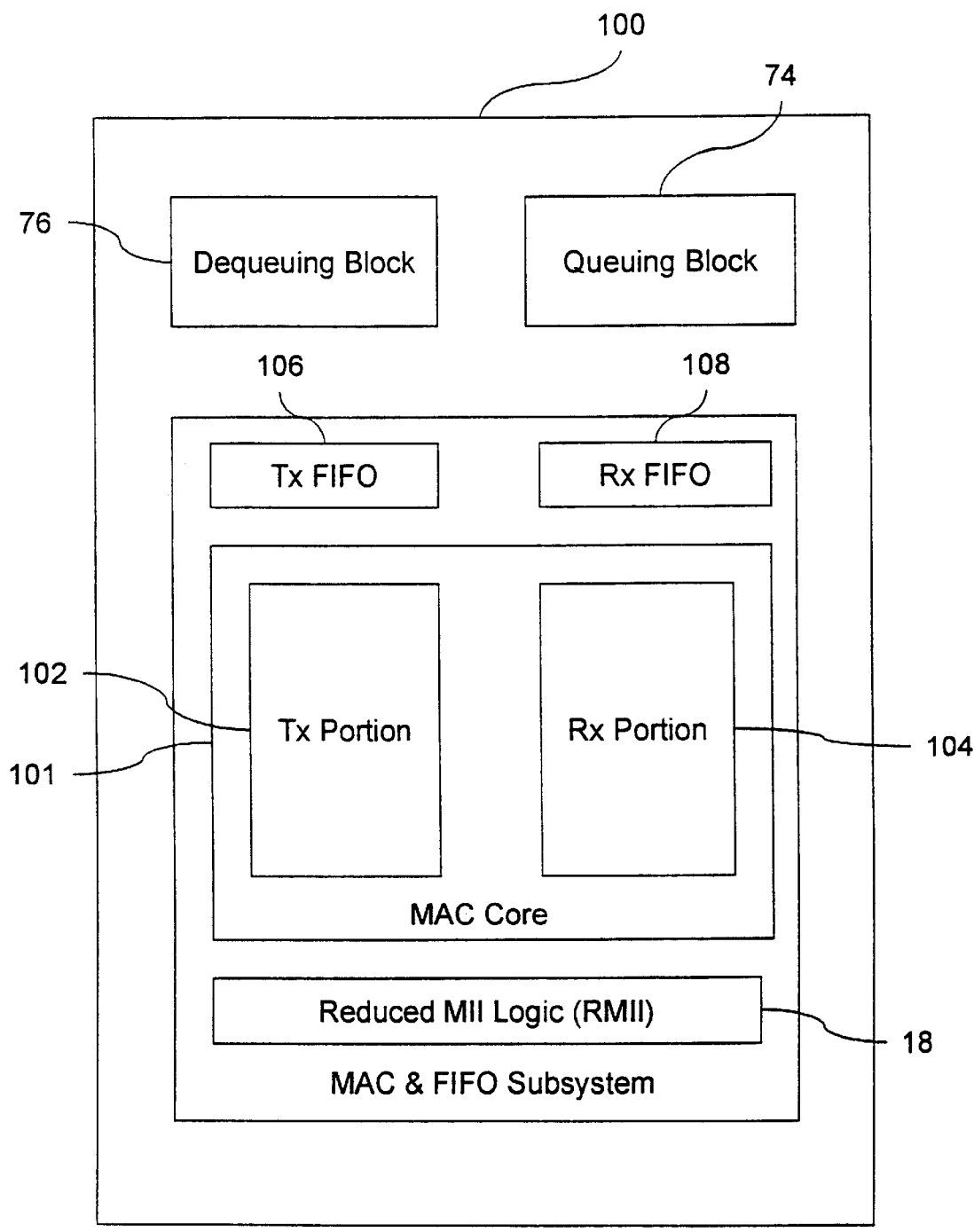
FIG. 4 is a block diagram of a network switch port system according to an embodiment of the present invention.

FIG. 4 illustrates an exemplary architecture for a port module 100 including a queuing block 74 and a dequeuing block 76. The MAC core 101 includes a transmit portion 102 and a receive portion 104 being respectively associated with the dequeuing and queuing blocks (76 and 74, respectively) of the port module 100. A transmit FIFO 106 is associated with the dequeuing block 76 for reading data from the external memory 36 and buffering data to be sent over the media 14 via the transit portion 102 and the reduced RMII logic 18. The queuing block 74 is associated with receiving data over the media 14 via the receive portion 104 and the receive FIFO 108 in order to write received data into the external memory 36.

Figure 5:
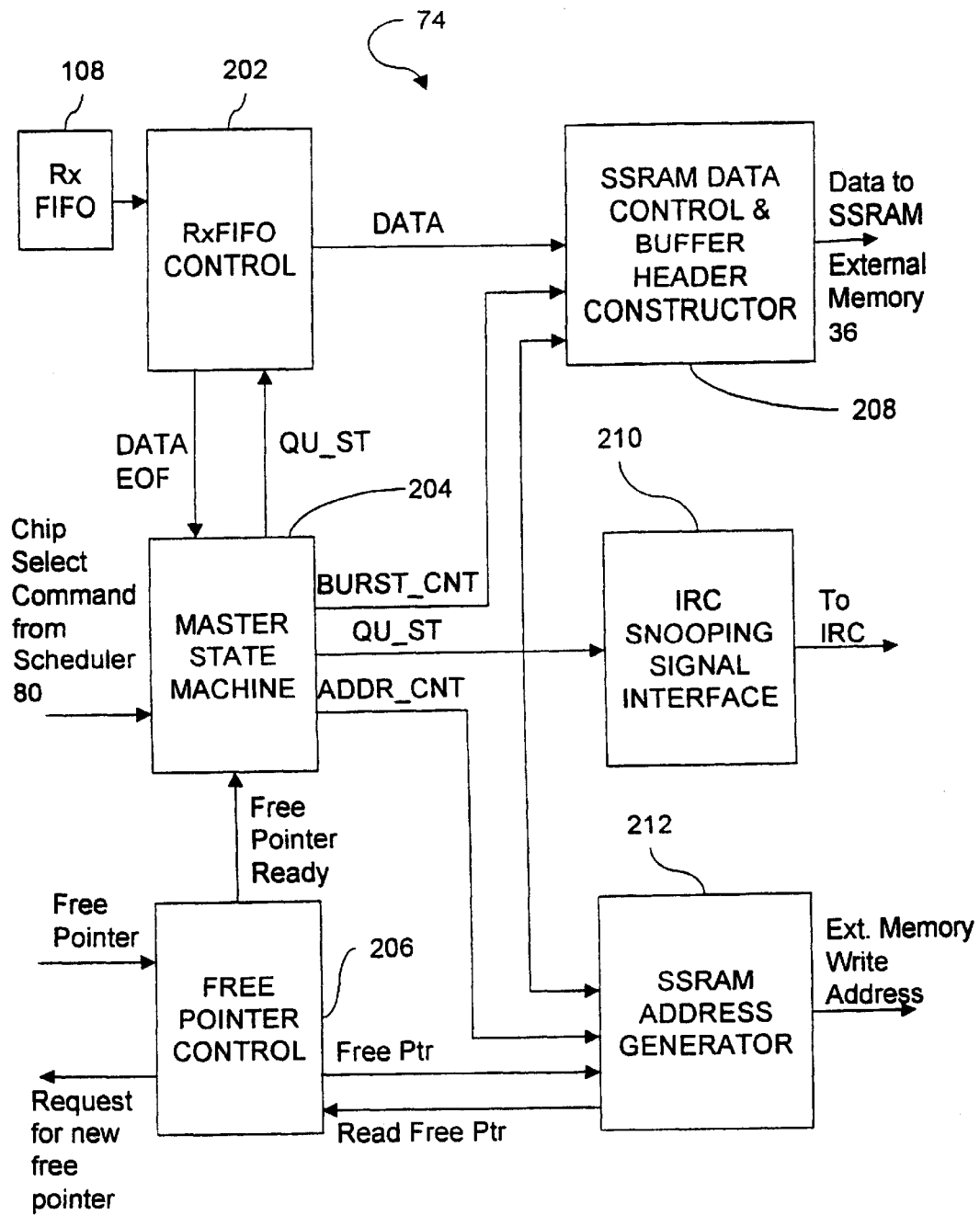
FIG. 5 is a block diagram of the queuing block portion of the network switch port system illustrated in FIG. 4.

In particular, a preferred embodiment of the queuing block 74 architecture is illustrated in the block diagram of FIG. 5. A receive FIFO control 202 receives data from the receive FIFO 108 and serves to control the reading of data from the receive FIFO 108. A master state machine 204 controls the queuing sequence as data is transferred from the receive FIFO 108 to the external memory 36 via, in part, the receive FIFO control 202. Free pointer control 206 is provided to receive free frame pointers used to address the data being stored in the external memory 36. In particular, the free pointer control 206 signals the master state machine 204 when a free pointer is ready and also delivers the free pointer to an SSRAM address generator 212. The address generator 212 provides an external memory write address indicating the location within the external memory 36 that the data is to be stored.

Additionally, as part of the data path, a SSRAM data control and buffer header constructor 208 is provided to construct the buffer frames that are to be stored in the external memory 36. To achieve this construction, data is received by the constructor 208 from the receive FIFO control 202 at the direction of the master state machine 204 via a signal QU_ST.

The signal QU_ST serves to control the data path based on a chip select command received by the master state machine 204 from the external memory interface scheduler 80. The chip select command communicates information to the master state machine 204 such as the data rate and the data path width for the port in which the particular state machine 204 is contained. For example, in a 100 Mbps port, the data path is 8 bytes wide and the scheduler assigns a small number of available slots to the port during a schedule cycle. For a Gbps port, the scheduler might assign a much larger number of available slots to the port during a schedule cycle and the data path could be 16 bytes wide by granting external memory access for 2 consecutive clock cycles.

Thus, dependent upon the data path width and data rate, the chip select signal from the scheduler 80 will vary in accordance with the particular port conditions it selects. The master state machine 204, in essence, issues the signal QU_ST in response to the chip select signal as a "master-slave" type relationship without regard to any particular reference clock signal. Hence, the state machine is scalable since it simply follows the chip select command without reliance on a common reference timing.

Additionally, the queuing block 74 includes an IRC snooping signal interface 210 that is signaled by the master state machine 204 with signal QU_ST. The IRC snooping signal interface 210 sends a signal to the IRC 40 to "snoop" the write bus 69a in order to prepare of the forwarding descriptor, described previously.

A notable feature of the queuing block 74 architecture is that the data path including the receive FIFO control 202 and the SSRAM data control and buffer header constructor 208 are partitioned from the master state machine logic 204. This partitioning affords the queuing block scalability of the data path without providing a separate control logic for each port data rate. Irrespective of the rate of the port, the architecture of the preferred embodiment for the queuing block 74 is adaptable to differing data rates according to the chip select signal received by the master state machine 204 from the scheduler 80. In turn, the master state machine 204 scales the burst count (BURST_CNT) and address count (ADDR_CNT) signals to the SSRAM data control and buffer header constructor 208 and SSRAM address generator 212, respectively, based upon the chip select command signal.

The employment of "handshaking" between the master state machine 204 and the data path logic (e.g., Rx FIFO control 202) affords the present embodiment scalability while maintaining a common architecture and state machine logic. That is, the state machine merely "listens" for a slot and performs a corresponding function independent of the data rate. Similar to the relationship between the scheduler and the master state machine 204, the relationship between the master state machine 204 and the data path control logic (i.e., 202 and 208) is, in essence a "master-slave" relationship requiring no timing synchronization between the two, but, instead, merely an initiation of control by the master state machine 204 upon the data path control logic (202 and 208).

Figure 6:
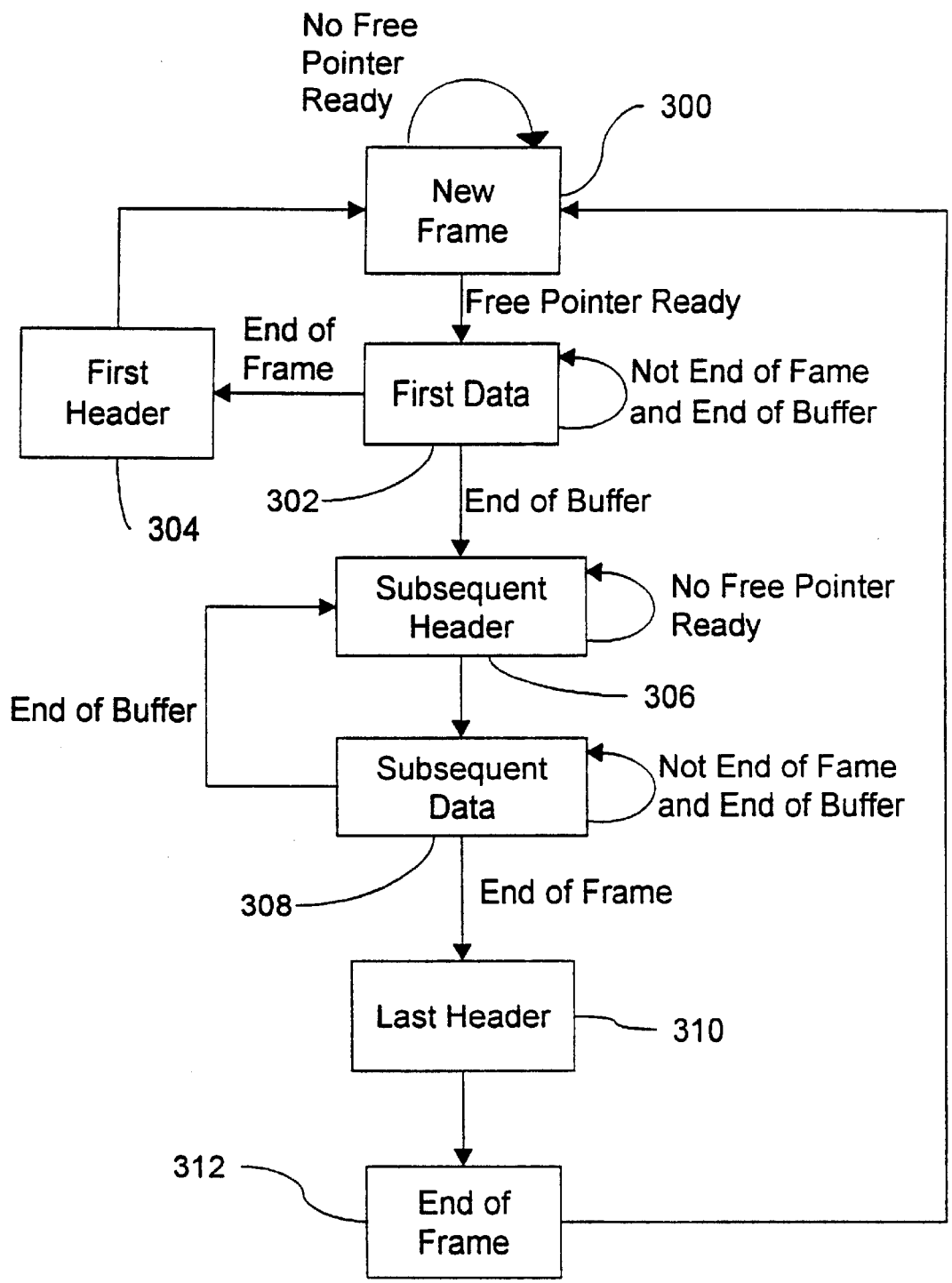
FIG. 6 is a state diagram illustrating the states of the master state machine of the queuing block portion illustrated in FIG. 5.

FIG. 6 illustrates a state diagram depicting the states of the state machine 204. In an initial state 300, the master state machine 204 awaits a free pointer for a new data frame. If no free pointer is available, the master state machine 204 remains at state 300 until such time that a free pointer is ready. When a free pointer is ready, as indicated by the free pointer ready signal from free pointer control 206, the master state machine 204 enters state 302 wherein data is written to the first buffer in the external memory 36.

While in state 302, the state machine 204 continuously checks to determine if the end of frame (EOF) or end of buffer (EOB) has been determined. Should an end of frame be detected such as, for example, in a frame having less than 256 bits according to the preferred buffer size, the master state machine 204 proceeds to state 304 and instructs. the SSRAM data control and buffer header constructor 208 to write a header into the buffer within the external memory 36. Alternatively, if the 256 bits of the buffer are filled without detecting an end of frame in state 302, the state machine 204 proceeds to state 306 wherein a header is written into the first buffer including the next frame pointer information, the buffer length of the first buffer. The state machine then determines whether a next free pointer is ready.

If a pointer is ready, the state machine 204 proceeds to state 308 in which subsequent data is written to corresponding subsequent buffer locations within the external memory 36. When the end of a buffer (EOB) is detected, the state machine directs the buffer header constructor 208 to write header data into the subsequent buffer that has been filled. If, in state 308, the end of the data frame is detected through issuance of the end of frame signal from the receive FIFO control 202 to the master state machine 204, the state machine 204 proceeds to write header information into the buffer into which data was last written and proceeds to state 312.

At state 312, the master state machine 204 directs the buffer header constructor 208 to return to the first buffer header and write the total frame length, a beginning-of-frame bit indicating that this buffer contains the beginning of the frame, and a good frame bit indicating that the frame did not experience any receive errors. The master state machine 204 then proceeds back to state 300 for reception of a new data frame.

Figure 7:
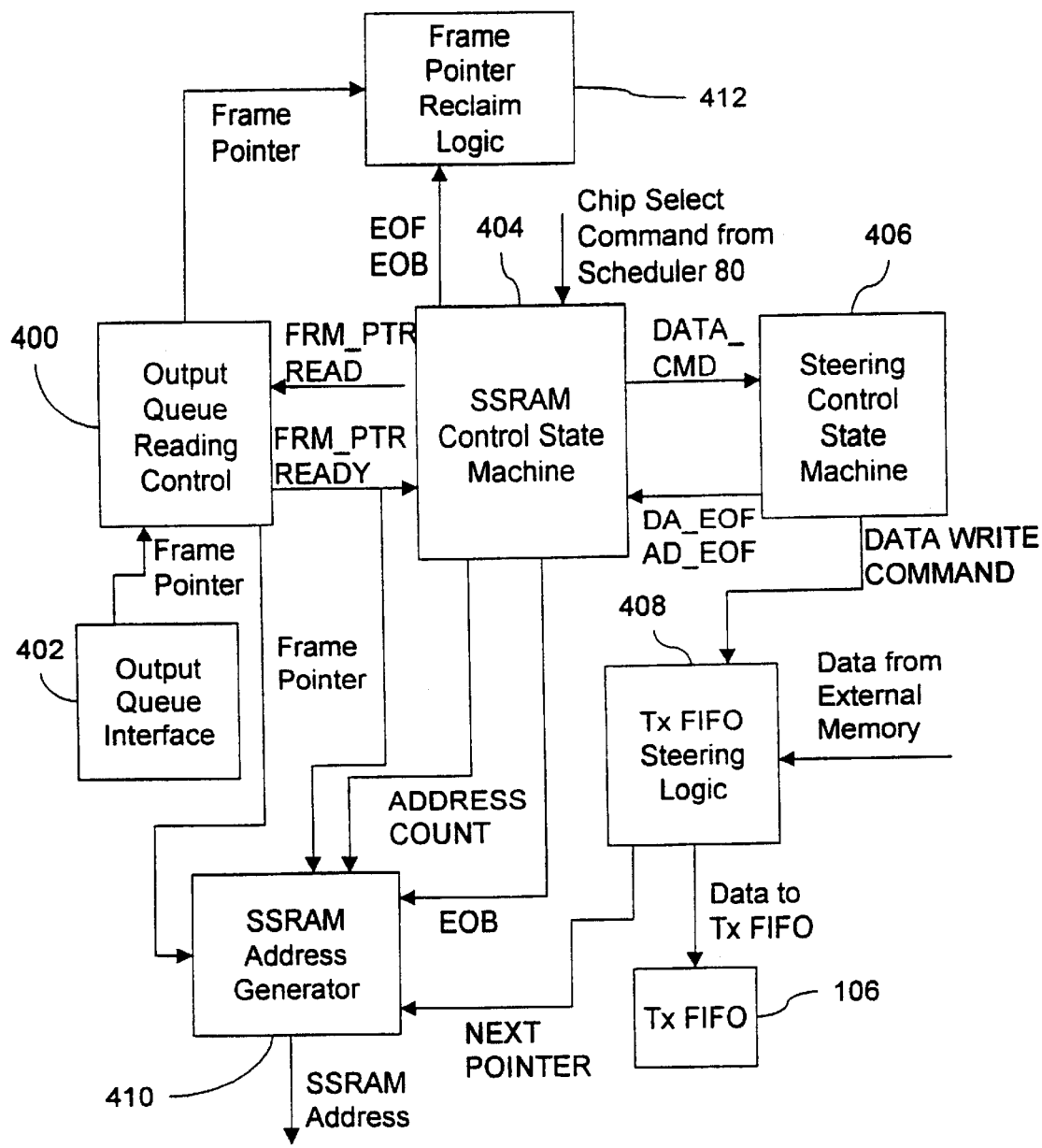
FIG. 7 is a block diagram of the dequeuing block portion of the network switch port system illustrated in FIG. 4.

FIG. 7 illustrates a preferred embodiment of the dequeuing block 76 architecture in block diagram form. The purpose of this architecture is to control the reading of data from the external memory 36 to the transmit FIFO 106 for transmission over the medium 14. An SSRAM control state machine 404 controls the operation of the dequeuing block 76 by issuing command signals to the other elements within the dequeuing blocks 76. Specifically, the SSRAM control state machine 404 directs the output queue reading control 400 to read a frame pointer from the output queue interface 402. When the output queue reading control 400 indicates that a frame pointer is ready, an SSRAM address generator 410 reads the frame pointer from the output queue reading control 400 and generates an SSRAM address signal to the SSRAM external memory 36 which, in turn, sends data to the transmit FIFO steering logic 408.

The transmit FIFO steering logic 408 sequences data flow to the transmit FIFO 106 for transmission over the medium 14. Additionally, the SSRAM address generator 410 accounts for "chaining" (i.e., linked multiple memory locations) of different frame pointers when more than one buffer in the external memory 36 is required to store a data frame. This is accomplished by receiving an end of buffer signal from the SSRAM control state machine 404 which communicates to the address generator 410 that a next address must be synthesized.

The transmit FIFO data steering logic 408 receives a data write command from a steering control state machine 406 which, in turn, is controlled by the data command signal (DATA_CMD) from the SSRAM control state machine 404. It is the data command signal from the SSRAM control state machine 404 that is scaled in order to allow this common architecture to be used for all port data rates.

The SSRAM control state machine 404 also receives a chip select command from the external memory scheduler 80 that provides the necessary information for the SSRAM control state machine to scale the data rate according to the slots and slot rate granted to the port in which it is located.

Additionally, the dequeuing block 76 includes a frame pointer reclaim logic 412 that returns used frame pointers to the multi-copy queue 60 or free buffer queue 64.

Figure 8:
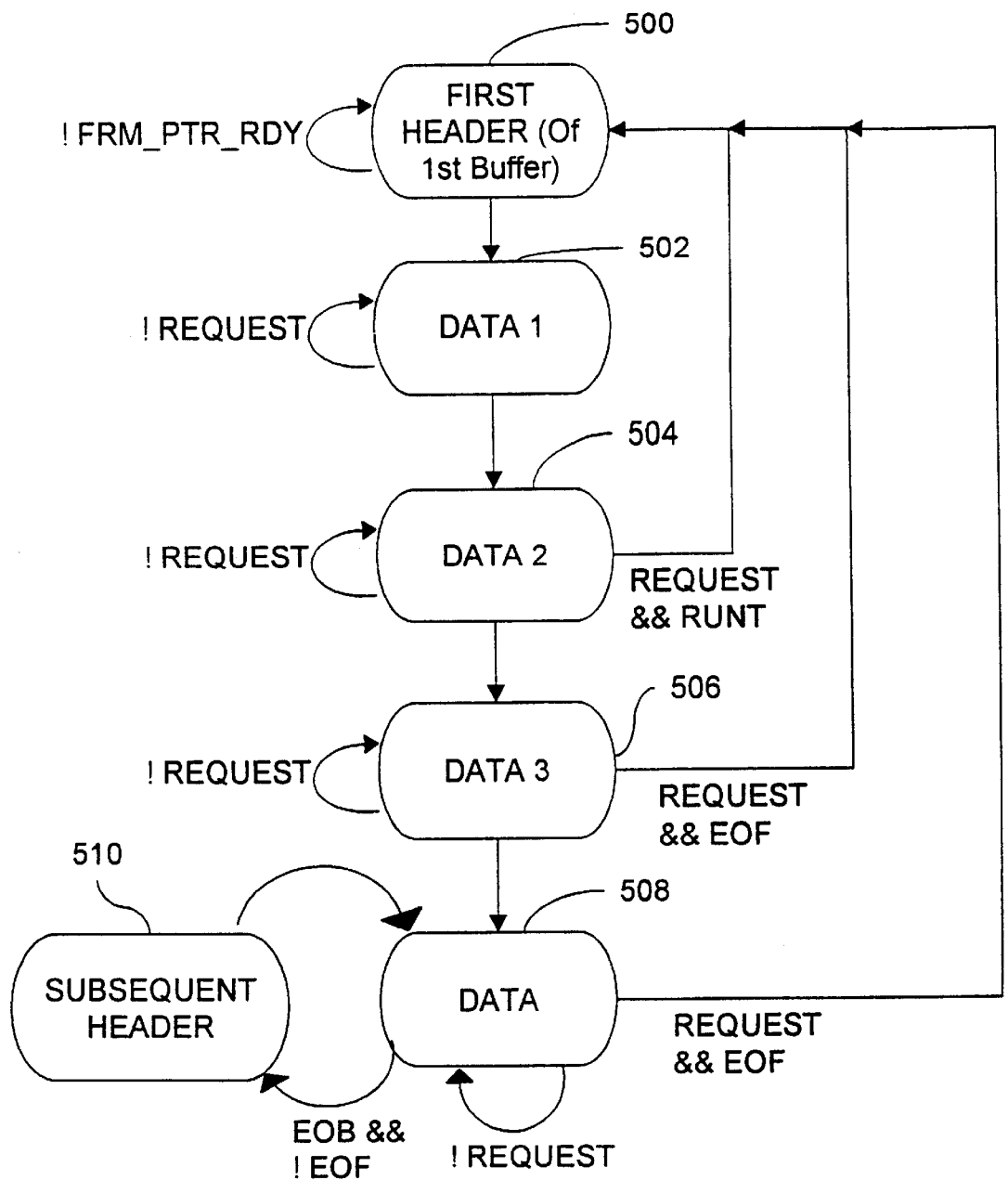
FIG. 8 is a state diagram illustrating the states of the SSRAM control state machine of the dequeuing block portion illustrated in FIG. 7.

FIG. 8 illustrates a diagram of the dequeuing operation by the state machine 404. As shown at state 500, the state machine 404 waits until a frame pointer is ready for reading a first header from a retrieved data frame. After the first header is read, the state machine 404 proceeds to state 502 wherein the first burst of data (DATA 1) is read from the external memory 36. The amount of data read in one burst is dependent upon the particular data rate of the port in which the dequeuing block 76 is located. For example, in a 100 megabit per second port, one burst would be equivalent to 8 bits of data. On the other hand, in a gigabit port, one burst would equal 16 bits of data. However, it is noteworthy that, irrespective of data rate, the state machine 404 only is concerned with reading a burst regardless of the amount of data in that burst. This allows the state machine to adapt to any rate at which the port is operating.

After state 502, the state machine 404 proceeds to state 504 in which a second burst of data (DATA 2) is read from the external memory 36. If the data packet does not occupy the entire buffer (i.e., the data packet is a "runt" packet less than 64 bytes) and a request signal is received, the state machine 404 returns to state 500 in anticipation of a new data frame. Otherwise, the state machine 404 enters state 506 in which the third data burst (DATA 3) is read. If, at state 506, the state machine 404 detects a request signal and the end of the data frame (EOF), the state machine 404 returns to state 500 in anticipation for another data frame. If the end of frame has not occurred, the state machine enters state 508 in which data bursts are read until the end of buffer (EOB) is detected. At such time, the state machine 404 enters state 510 in which a subsequent header within the frame is read and then subsequently returns the state machine to state 508 wherein data bursts are read from the next buffer. When the end of frame (EOF) is detected in state 508, the state machine returns to state 500 in anticipation for the next data frame to be read.

Figure 9:
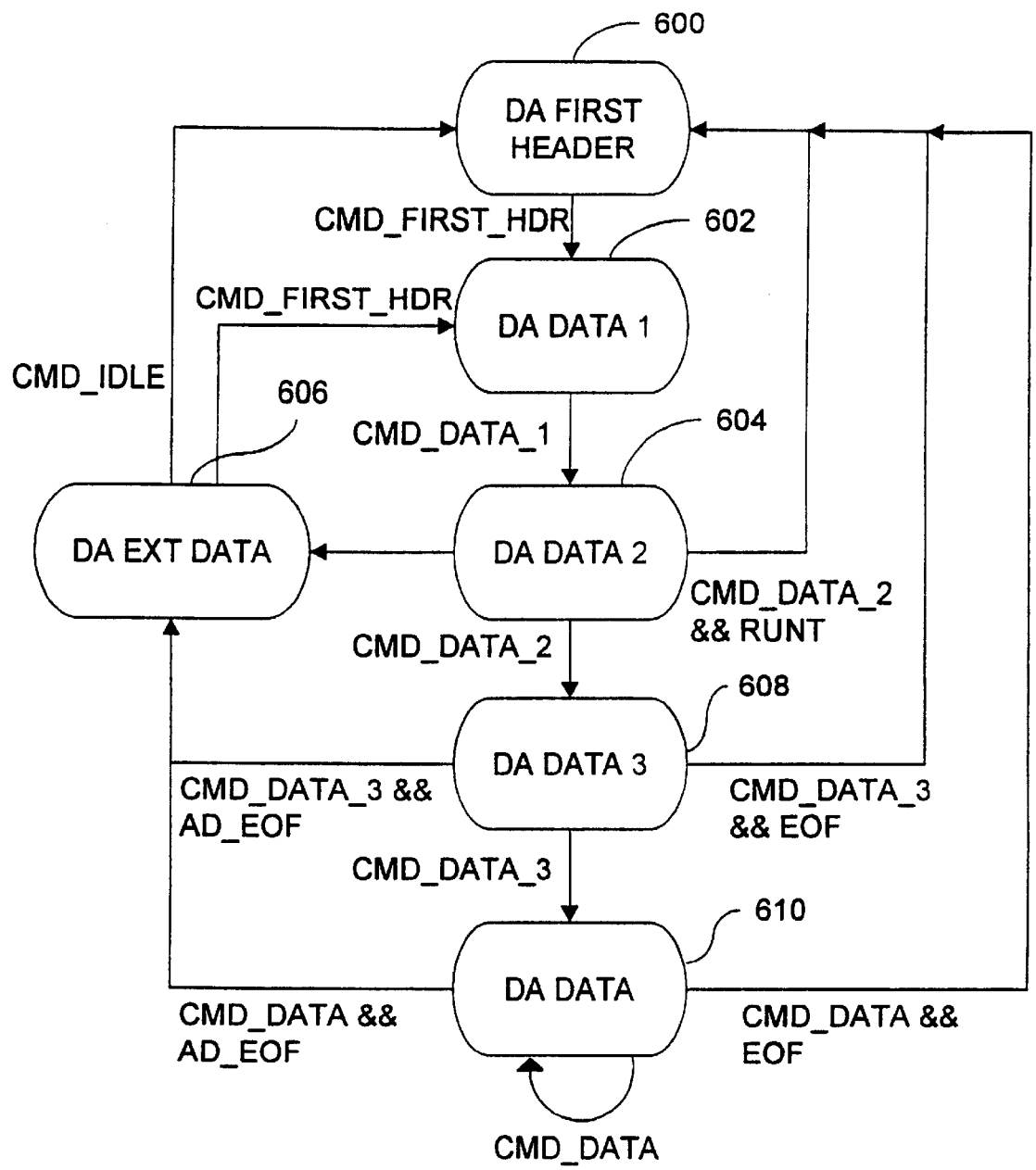
FIG. 9 is a state diagram illustrating the states of the steering control state machine of the dequeuing block portion illustrated in FIG. 7.

FIG. 9 illustrates a state diagram of the transmit FIFO data steering control state machine 406. As shown, the initial state 600 awaits to receive a first data header (DA FIRST HEADER) from the external memory 36. When the transmit FIFO data steering control state machine 406 receives a first header data command signal (CMD_FIRST_HDR) from the state machine 404, the steering control state machine 406 proceeds to state 602 showing a receiving state for a first data burst (DA DATA 1). When the steering control state machine 406 receives a first data command signal (CMD_DATA_1) from the state machine 404, its state proceeds to state 604 wherein a second data burst (DA DATA 2) is received. Should the steering control state machine 406 detect that the data is a runt frame, it then returns to state 600 in anticipation of a next data frame header. Alternatively, if the steering control state machine 406 detects an address end of frame (AD_EOF), which corresponds to the end of the data buffer within the external memory 36, the state machine 406 proceeds to state 606. State 606 is an extended data state in which extra data is added to the data being written to the transmit FIFO 106 by the transmit FIFO steering logic 408. If only another CMD DATA signal (i.e., CMD_DATA_2) is received, the state machine 406 proceeds to state 608.

Similarly, the other data burst states 608 and 610 continue to sequence the writing of data to the transmit FIFO 106 until either a data end of frame (DA_EOF) or an address end of frame (AD_EOF) has been detected. In the case of detection of the data end of frame, the steering control state machine 406 returns to state 600 in anticipation of a next data frame. If an address end of frame is detected, the state machine 406 proceeds to state 606 to add any extended data that is to be written to the transmit FIFO 106. From state 606, the state machine 406 will either return back to the first header data receive state 600 if no command signal is received (i.e., CMD_IDLE) from the state machine 404 or to the first data burst state 602 if a command signal (CMD_FIRST_HDR) is received.

In both the queuing 74 and dequeuing 76 blocks, the partitioning of the state machine logic from the data path affords the present invention scalability while maintaining the common architectures for different data rates from approximately 10 Mbps to 10 Gbps. Each of the state machines within the queuing and dequeuing blocks (74 and 76) receives a chip select signal from the external memory scheduler 80 which effectively communicates to the state machines that the data rate is set at a particular rate. In responding to this chip select signal, each of the state machines does not change its internal operation dependent on rate but, rather, acts in dependence on the timing and information of the chip select signal in a "master-slave" type of arrangement. In turn, the data path control for each of the queuing and dequeuing block architectures receives command signals from the state machines acting in dependence on the chip select signal in a similar "master-slave" arrangement. Thus, the state machines and data path control portions of the queuing and dequeuing blocks merely respond to signal events occurring rather than the timing of those events. Hence, the queuing and dequeuing blocks may perform control of the data path irrespective of the data rate of the port in which it is located. Correspondingly, the common architectures scalable to any one of a number of data rates affords interchangeability and, therefore, reduced complexity and cost of manufacturing of the network switch ports.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A network switch arrangement comprising:
   an external memory for temporarily storing data packets to be forwarded by the network switch;
   at least one network switch port having a predetermined data rate for receiving data packets from network nodes and transmitting data packets to said network nodes;
   a data packet transmission controller associated with the at least one network switch port for controlling the transmission of data packets between the external memory and the at least one network switch port;
   an external memory controller;
   a state machine within the data packet transmission controller for receiving predetermined information from the external memory controller concerning the data rate of one of data packets being transmitted from the at least one network switch port and data packets being received by the at least one network switch port, and the state machine issuing a command signal based on the predetermined information; and
   data path logic within the data packet transmission controller for receiving the command signal and configured to control transmission of data packets based on the received command signal, the data path logic also configured to scale a data path for transmission of data packets between the at least one network switch port and the external memory based on the predetermined data rate of the network switch port.

2. The arrangement of claim 1, further comprising an address generator that generates an address to be used by the external memory controller for at least one of storing and accessing data in the external memory.

3. The arrangement of claim 1, wherein the state machine has a predetermined logic configured to receive a chip select command from an external memory scheduler, the external memory scheduler configured to assign memory access slots corresponding to the data rate of the at least one network switch port.

4. The arrangement of claim 3, wherein the predetermined logic is configured to scale the data path in accordance with a data rate set by the external memory scheduler.

5. The arrangement of claim 1 wherein the data rate of the at least one network switch port is one of 10 Mbps, 100 Mbps, 1 Gbps and 1.2 Gbps.

6. The arrangement of claim 1, wherein the data path logic is configured to receive data packets from a port receive buffer and route the data packets to the external memory for storage.

7. The arrangement of claim 1, wherein the data path logic is configured to receive data from the external memory and route the data to a port transmit buffer for transmission by the at least one network switch port.

8. A method of controlling a transmitting and receiving data path for a network switch port having a predetermined data rate for receiving data packets from and transmitting data packets to network nodes, comprising the steps of:
   writing data received at the network switch port to an external memory and reading data to be transmitted by the network switch port from the external memory via the transmitting and receiving data path;
   generating a control signal to control the transmitting and receiving data path based upon the predetermined data rate of a particular data packet being received by the network switch port or transmitted from the network switch port; and
   scaling the transmitting and receiving data path based upon the control signal, wherein
   scaling includes controlling an amount of data read from the external memory during a read burst.

9. The method according to claim 8, wherein the scaling is base on the predetermined data rate for the network switch port selected by an external memory interface scheduler.

10. The method according to claim 9, wherein the data rate is one of 10 Mbps, 100 Mbps, 1 Gbps and 1.2 Gbps.

11. The method according to claim 9, further comprising the steps of:
    receiving data from a receive buffer in the network switch port;
    preparing the data for storage in the external memory;
    addressing one or more storage locations within the external memory in which to store the prepared data based on the control signal; and
    and writing the prepared data to the one or more addressed storage locations.

12. The method according to claim 11, wherein the step of preparing the data for storage includes separating the data into one or more packets of a predetermined number of bytes.

13. The method according to claim 12, wherein the step of addressing one or more storage locations within the external memory includes assigning a separate storage location to each of the one or more packets.

14. The according to claim 9, further comprising the steps of:

retrieving a frame pointer addressing a specific location within the external memory;

generating an address based on the retrieved frame pointer that addresses the specific location;

retrieving data stored in the specific location from the external memory and transmitting the data over a medium attached to the network switch port at the certain defined rate.

* * * * *

UNITED STATES PATENT AND TRADEMARK OFFICE
CERTIFICATE OF CORRECTION

PATENT NO. : 6,597,693 B1
DATED : July 22, 2003
INVENTOR(S) : Eric Tsin-Ho Leung It is certified that error appears in the above-identified patent and that said Letters Patent is hereby corrected as shown below:

<u>Column 15,</u>
Line 1, after "The" insert -- method --

Signed and Sealed this

Twenty-eighth Day of October, 2003

JAMES E. ROGAN
*Director of the United States Patent and Trademark Office*